US011961486B2

(12) United States Patent
Xiao et al.

(10) Patent No.: US 11,961,486 B2
(45) Date of Patent: Apr. 16, 2024

(54) DISPLAY DRIVING DEVICE, DISPLAY DRIVING METHOD, AND DISPLAY DEVICE

(71) Applicants: Wuhan BOE Optoelectronics Technology Co.,Ltd., Hubei (CN); BOE TECHNOLOGY GROUP CO., LTD., Beijing (CN)

(72) Inventors: Lijun Xiao, Beijing (CN); Bing Li, Beijing (CN); Feng Jiang, Beijing (CN); Meng Feng, Beijing (CN); Mengchao Shuai, Beijing (CN); Hangyu Chen, Beijing (CN); Junmin Zhang, Beijing (CN)

(73) Assignees: Wuhan BOE Optoelectronics Technology Co., Ltd., Hubei (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/802,131

(22) PCT Filed: Oct. 28, 2021

(86) PCT No.: PCT/CN2021/126958
§ 371 (c)(1),
(2) Date: Aug. 24, 2022

(87) PCT Pub. No.: WO2022/127395
PCT Pub. Date: Jun. 23, 2022

(65) Prior Publication Data
US 2023/0071402 A1 Mar. 9, 2023

(30) Foreign Application Priority Data
Dec. 14, 2020 (CN) ............................ 202011471315

(51) Int. Cl.
*G09G 3/36* (2006.01)
*G09G 3/20* (2006.01)

(52) U.S. Cl.
CPC ......... *G09G 3/3607* (2013.01); *G09G 3/2096* (2013.01); *G09G 3/3614* (2013.01); *G09G 3/3685* (2013.01); *G09G 2320/0223* (2013.01)

(58) Field of Classification Search
CPC .. G09G 3/3607; G09G 3/2096; G09G 3/3614; G09G 3/3685; G09G 3/36;
(Continued)

(56) References Cited

U.S. PATENT DOCUMENTS

2005/0073493 A1 4/2005 Chen et al.
2008/0284775 A1* 11/2008 Shen .................... G09G 3/3611
345/214
(Continued)

FOREIGN PATENT DOCUMENTS

CN 101490737 A 7/2009
CN 107886910 A 4/2018
(Continued)

OTHER PUBLICATIONS

China Patent Office, CN202011471315.6 First Office Action, dated Dec. 2, 2021.
(Continued)

*Primary Examiner* — David Tung
(74) *Attorney, Agent, or Firm* — HOUTTEMAN LAW LLC

(57) ABSTRACT

A display driving device configured to control a display panel including pixel units to display, includes: an over driver compensation module configured to, when a first polarity frame image is displayed, perform line over driver compensation on the pixel units based on line over driver compensation data corresponding to the first polarity frame
(Continued)

image, to determine a target over driver grayscale of the pixel units; and to, when a second polarity frame image is displayed, perform line over driver compensation on the pixel units based on line over driver compensation data corresponding to the second polarity frame image, to determine a target over driver grayscale of the pixel units. The first and second polarity are opposite to each other, and the line over driver compensation data corresponding to the first polarity frame image is different from the line over driver compensation data corresponding to the second polarity frame image.

14 Claims, 6 Drawing Sheets

(58) Field of Classification Search
CPC ... G09G 2320/0223; G09G 2320/0252; G09G 2340/16
See application file for complete search history.

(56) References Cited

U.S. PATENT DOCUMENTS

| | | | | |
|---|---|---|---|---|
| 2009/0267884 | A1* | 10/2009 | Takahashi | G09G 3/3648 345/96 |
| 2012/0001951 | A1 | 1/2012 | Katagawa | |
| 2012/0169720 | A1* | 7/2012 | Moh | G09G 3/3614 345/419 |
| 2014/0116373 | A1* | 5/2014 | Jiang | F16C 9/00 123/197.3 |
| 2017/0287418 | A1* | 10/2017 | Hwang | G09G 3/3614 |

FOREIGN PATENT DOCUMENTS

| | | | |
|---|---|---|---|
| CN | 109741717 | A | 5/2019 |
| CN | 110189726 | A | 8/2019 |
| CN | 110942754 | A | 3/2020 |
| CN | 111028761 | A | 4/2020 |
| CN | 111862889 | A | 10/2020 |
| CN | 111968589 | A | 11/2020 |
| CN | 112581919 | A | 3/2021 |
| TW | 201316325 | A | 4/2013 |

OTHER PUBLICATIONS

China Patent Office, CN202011471315.6 Second Office Action, dated Jun. 9, 2022.

* cited by examiner

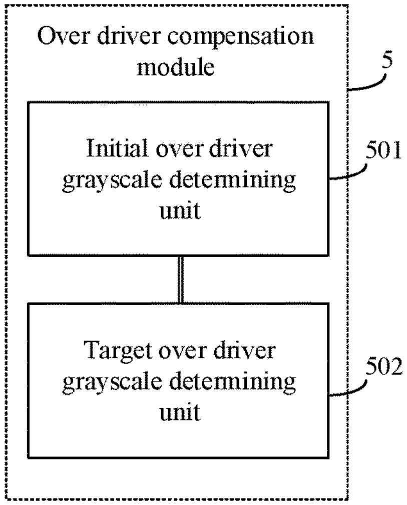

FIG. 5

| Initial over driver grayscale | | Current line standard grayscale | | | | | | | | | | | | | |
|---|---|---|---|---|---|---|---|---|---|---|---|---|---|---|---|
| | | L0 | L1 | L2 | L3 | L4 | L5 | L6 | L7 | L8 | L9 | 10 | …… | L254 | L255 |
| Previous line standard grayscale | L0 | $A_{1,1}$ | $A_{1,2}$ | $A_{1,3}$ | $A_{1,4}$ | $A_{1,5}$ | $A_{1,6}$ | $A_{1,7}$ | $A_{1,8}$ | $A_{1,9}$ | $A_{1,10}$ | $A_{1,11}$ | …… | $A_{1,255}$ | $A_{1,256}$ |
| | L1 | $A_{2,1}$ | $A_{2,2}$ | $A_{2,3}$ | $A_{2,4}$ | $A_{2,5}$ | $A_{2,6}$ | $A_{2,7}$ | $A_{2,8}$ | $A_{2,9}$ | $A_{2,10}$ | $A_{2,11}$ | …… | $A_{2,255}$ | $A_{2,256}$ |
| | L2 | $A_{3,1}$ | $A_{3,2}$ | $A_{3,3}$ | $A_{3,4}$ | $A_{3,5}$ | $A_{3,6}$ | $A_{3,7}$ | $A_{3,8}$ | $A_{3,9}$ | $A_{3,10}$ | $A_{3,11}$ | …… | $A_{3,255}$ | $A_{3,256}$ |
| | L3 | $A_{4,1}$ | $A_{4,2}$ | $A_{4,3}$ | $A_{4,4}$ | $A_{4,5}$ | $A_{4,6}$ | $A_{4,7}$ | $A_{4,8}$ | $A_{4,9}$ | $A_{4,10}$ | $A_{4,11}$ | …… | $A_{4,255}$ | $A_{4,256}$ |
| | L4 | $A_{5,1}$ | $A_{5,2}$ | $A_{5,3}$ | $A_{5,4}$ | $A_{5,5}$ | $A_{5,6}$ | $A_{5,7}$ | $A_{5,8}$ | $A_{5,9}$ | $A_{5,10}$ | $A_{5,11}$ | …… | $A_{5,255}$ | $A_{5,256}$ |
| | L5 | $A_{6,1}$ | $A_{6,2}$ | $A_{6,3}$ | $A_{6,4}$ | $A_{6,5}$ | $A_{6,6}$ | $A_{6,7}$ | $A_{6,8}$ | $A_{6,9}$ | $A_{6,10}$ | $A_{6,11}$ | …… | $A_{6,255}$ | $A_{6,256}$ |
| | L6 | $A_{7,1}$ | $A_{7,2}$ | $A_{7,3}$ | $A_{7,4}$ | $A_{7,5}$ | $A_{7,6}$ | $A_{7,7}$ | $A_{7,8}$ | $A_{7,9}$ | $A_{7,10}$ | $A_{7,11}$ | …… | $A_{7,255}$ | $A_{7,256}$ |
| | L7 | $A_{8,1}$ | $A_{8,2}$ | $A_{8,3}$ | $A_{8,4}$ | $A_{8,5}$ | $A_{8,6}$ | $A_{8,7}$ | $A_{8,8}$ | $A_{8,9}$ | $A_{8,10}$ | $A_{8,11}$ | …… | $A_{8,255}$ | $A_{8,256}$ |
| | L8 | $A_{9,1}$ | $A_{9,2}$ | $A_{9,3}$ | $A_{9,4}$ | $A_{9,5}$ | $A_{9,6}$ | $A_{9,7}$ | $A_{9,8}$ | $A_{9,9}$ | $A_{9,10}$ | $A_{9,11}$ | …… | $A_{9,255}$ | $A_{9,256}$ |
| | L9 | $A_{10,1}$ | $A_{10,2}$ | $A_{10,3}$ | $A_{10,4}$ | $A_{10,5}$ | $A_{10,6}$ | $A_{10,7}$ | $A_{10,8}$ | $A_{10,9}$ | $A_{10,10}$ | $A_{10,11}$ | …… | $A_{10,255}$ | $A_{10,256}$ |
| | L10 | $A_{11,1}$ | $A_{11,2}$ | $A_{11,3}$ | $A_{11,4}$ | $A_{11,5}$ | $A_{11,6}$ | $A_{11,7}$ | $A_{11,8}$ | $A_{11,9}$ | $A_{11,10}$ | $A_{11,11}$ | …… | $A_{11,255}$ | $A_{11,256}$ |
| | …… | …… | …… | …… | …… | …… | …… | …… | …… | …… | …… | …… | $A_{x,x}$ | …… | …… |
| | L254 | $A_{255,1}$ | $A_{255,2}$ | $A_{255,3}$ | $A_{255,4}$ | $A_{255,5}$ | $A_{255,6}$ | $A_{255,7}$ | $A_{255,8}$ | $A_{255,9}$ | $A_{255,10}$ | $A_{255,11}$ | …… | $A_{255,255}$ | $A_{255,256}$ |
| | L255 | $A_{256,1}$ | $A_{256,2}$ | $A_{256,3}$ | $A_{256,4}$ | $A_{256,5}$ | $A_{256,6}$ | $A_{256,7}$ | $A_{256,8}$ | $A_{256,9}$ | $A_{256,10}$ | $A_{256,11}$ | …… | $A_{256,255}$ | $A_{256,256}$ |

FIG. 6a

| Initial over driver grayscale | | Current line standard grayscale | | | | | | | | | | | | | |
|---|---|---|---|---|---|---|---|---|---|---|---|---|---|---|---|
| | | L0 | L16 | L32 | L48 | L64 | L80 | L96 | L112 | L128 | L144 | L160 | ...... | L240 | L255 |
| Previous line standard grayscale | L0 | $B_{1,1}$ | $B_{1,2}$ | $B_{1,3}$ | $B_{1,4}$ | $B_{1,5}$ | $B_{1,6}$ | $B_{1,7}$ | $B_{1,8}$ | $B_{1,9}$ | $B_{1,10}$ | $B_{1,11}$ | ...... | $B_{1,16}$ | $B_{1,17}$ |
| | L16 | $B_{2,1}$ | $B_{2,2}$ | $B_{2,3}$ | $B_{2,4}$ | $B_{2,5}$ | $B_{2,6}$ | $B_{2,7}$ | $B_{2,8}$ | $B_{2,9}$ | $B_{2,10}$ | $B_{2,11}$ | ...... | $B_{2,16}$ | $B_{2,17}$ |
| | L32 | $B_{3,1}$ | $B_{3,2}$ | $B_{3,3}$ | $B_{3,4}$ | $B_{3,5}$ | $B_{3,6}$ | $B_{3,7}$ | $B_{3,8}$ | $B_{3,9}$ | $B_{3,10}$ | $B_{3,11}$ | ...... | $B_{3,16}$ | $B_{3,17}$ |
| | L48 | $B_{4,1}$ | $B_{4,2}$ | $B_{4,3}$ | $B_{4,4}$ | $B_{4,5}$ | $B_{4,6}$ | $B_{4,7}$ | $B_{4,8}$ | $B_{4,9}$ | $B_{4,10}$ | $B_{4,11}$ | ...... | $B_{4,16}$ | $B_{4,17}$ |
| | L64 | $B_{5,1}$ | $B_{5,2}$ | $B_{5,3}$ | $B_{5,4}$ | $B_{5,5}$ | $B_{5,6}$ | $B_{5,7}$ | $B_{5,8}$ | $B_{5,9}$ | $B_{5,10}$ | $B_{5,11}$ | ...... | $B_{5,16}$ | $B_{5,17}$ |
| | L80 | $B_{6,1}$ | $B_{6,2}$ | $B_{6,3}$ | $B_{6,4}$ | $B_{6,5}$ | $B_{6,6}$ | $B_{6,7}$ | $B_{6,8}$ | $B_{6,9}$ | $B_{6,10}$ | $B_{6,11}$ | ...... | $B_{6,16}$ | $B_{6,17}$ |
| | L96 | $B_{7,1}$ | $B_{7,2}$ | $B_{7,3}$ | $B_{7,4}$ | $B_{7,5}$ | $B_{7,6}$ | $B_{7,7}$ | $B_{7,8}$ | $B_{7,9}$ | $B_{7,10}$ | $B_{7,11}$ | ...... | $B_{7,16}$ | $B_{7,17}$ |
| | L112 | $B_{8,1}$ | $B_{8,2}$ | $B_{8,3}$ | $B_{8,4}$ | $B_{8,5}$ | $B_{8,6}$ | $B_{8,7}$ | $B_{8,8}$ | $B_{8,9}$ | $B_{8,10}$ | $B_{8,11}$ | ...... | $B_{8,16}$ | $B_{8,17}$ |
| | L128 | $B_{9,1}$ | $B_{9,2}$ | $B_{9,3}$ | $B_{9,4}$ | $B_{9,5}$ | $B_{9,6}$ | $B_{9,7}$ | $B_{9,8}$ | $B_{9,9}$ | $B_{9,10}$ | $B_{9,11}$ | ...... | $B_{9,16}$ | $B_{9,17}$ |
| | L144 | $B_{10,1}$ | $B_{10,2}$ | $B_{10,3}$ | $B_{10,4}$ | $B_{10,5}$ | $B_{10,6}$ | $B_{10,7}$ | $B_{10,8}$ | $B_{10,9}$ | $B_{10,10}$ | $B_{10,11}$ | ...... | $B_{10,16}$ | $B_{10,17}$ |
| | L160 | $B_{11,1}$ | $B_{11,2}$ | $B_{11,3}$ | $B_{11,4}$ | $B_{11,5}$ | $B_{11,6}$ | $B_{11,7}$ | $B_{11,8}$ | $B_{11,9}$ | $B_{11,10}$ | $B_{11,11}$ | ...... | $B_{11,16}$ | $B_{11,17}$ |
| | ...... | ...... | ...... | ...... | ...... | ...... | ...... | ...... | ...... | ...... | ...... | ...... | $B_{i,j}$ | ...... | ...... |
| | L240 | $B_{16,1}$ | $B_{16,2}$ | $B_{16,3}$ | $B_{16,4}$ | $B_{16,5}$ | $B_{16,6}$ | $B_{16,7}$ | $B_{16,8}$ | $B_{16,9}$ | $B_{16,10}$ | $B_{16,11}$ | ...... | $B_{16,16}$ | $B_{16,17}$ |
| | L255 | $B_{17,1}$ | $B_{17,2}$ | $B_{17,3}$ | $B_{17,4}$ | $B_{17,5}$ | $B_{17,6}$ | $B_{17,7}$ | $B_{17,8}$ | $B_{17,9}$ | $B_{17,10}$ | $B_{17,11}$ | ...... | $B_{17,16}$ | $B_{17,17}$ |

FIG. 6b

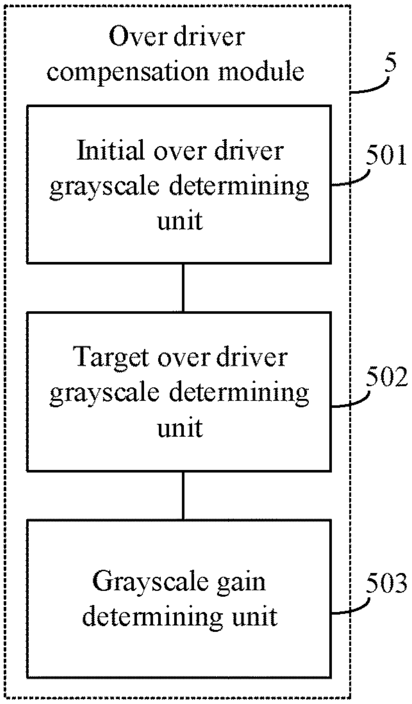

FIG. 7

| Grayscale gain value | | Column position | | | |
|---|---|---|---|---|---|
| | | 1 | 2 | 3 | 4 |
| Row position | 1 | $Q_{1,1}$ | $Q_{1,2}$ | $Q_{1,3}$ | $Q_{1,4}$ |
| | 2 | $Q_{2,1}$ | $Q_{2,2}$ | $Q_{2,3}$ | $Q_{2,4}$ |
| | 3 | $Q_{3,1}$ | $Q_{3,2}$ | $Q_{3,3}$ | $Q_{3,4}$ |
| | 4 | $Q_{4,1}$ | $Q_{4,2}$ | $Q_{4,3}$ | $Q_{4,4}$ |
FIG. 8
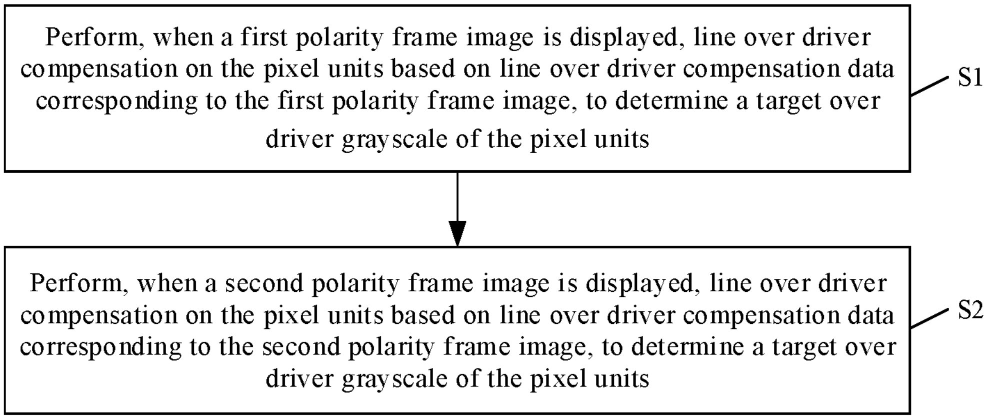
FIG. 9
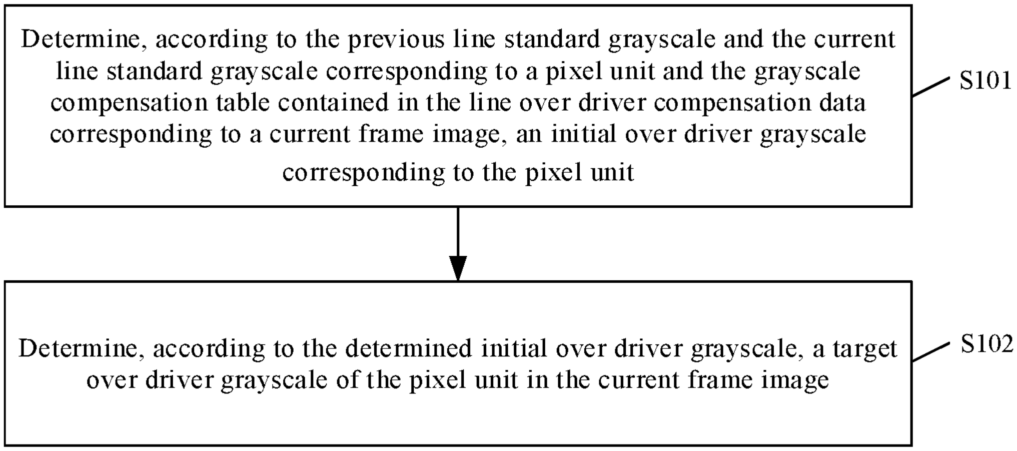
FIG. 10

DISPLAY DRIVING DEVICE, DISPLAY DRIVING METHOD, AND DISPLAY DEVICE

TECHNICAL FIELD

The present disclosure relates to the field of display technology, and in particular relates to a display driving device, a display driving method, and a display device.

BACKGROUND

As the resolution of display devices becomes higher and higher, and the size of panels becomes larger and larger, various types of machines have shorter charging time but higher panel resistance capacitance (RC), leading to more and more prominent problems in charging rate. The existing art proposes a line over driver (Line OD) technique that enables liquid crystals to achieve desired deflection in a short time. The principle of Line OD is: when a data signal on a data line is to be switched from a grayscale of corresponding pixels in a previous line to a target grayscale of pixels in a current line, if a driving voltage merely for the current line target grayscale is applied, the actually desired current line target grayscale cannot be achieved due to a slow response speed of liquid crystal turnover; and with Line OD, a driving voltage corresponding to an over driver grayscale with a larger difference from the driving voltage corresponding to the current line target grayscale is provided, so that the liquid crystal turnover speed is increased, and thus the actually desired current line target grayscale is achieved.

SUMMARY

Embodiments of the present disclosure provide a display driving device, a display driving method, and a display device.

In a first aspect, an embodiment of the present disclosure provides a display driving device configured to control a display panel to display, where the display panel includes a plurality of pixel units, and the display driving device includes:

an over driver compensation module configured to, when a first polarity frame image is displayed, perform line over driver compensation on the pixel units based on line over driver compensation data corresponding to the first polarity frame image, to determine a target over driver grayscale of the pixel units; and to, when a second polarity frame image is displayed, perform line over driver compensation on the pixel units based on line over driver compensation data corresponding to the second polarity frame image, to determine a target over driver grayscale of the pixel units;

where the first polarity and the second polarity are opposite to each other, and the line over driver compensation data corresponding to the first polarity frame image is different from the line over driver compensation data corresponding to the second polarity frame image.

In some embodiments, the display driving device further includes:

a storage module configured to store the line over driver compensation data corresponding to the first polarity frame image and the second polarity frame image, respectively.

In some embodiments, the line over driver compensation data includes: a grayscale compensation table configured to record different combinations of previous line standard grayscales and current line standard grayscales, and initial over driver grayscales corresponding to the combinations; and the over driver compensation module includes:

an initial over driver grayscale determining unit configured to determine, according to the previous line standard grayscale and the current line standard grayscale corresponding to a pixel unit and the grayscale compensation table included in the line over driver compensation data corresponding to a current frame image, an initial over driver grayscale corresponding to the pixel unit; and a target over driver grayscale determining unit configured to determine, according to the determined initial over driver grayscale, a target over driver grayscale of the pixel unit in the current frame image.

In some embodiments, the gray compensation table included in the line over driver compensation data corresponding to the first polarity frame image is a first grayscale compensation table;

the gray compensation table included in the line over driver compensation data corresponding to the second polarity frame image is a second grayscale compensation table; and the first grayscale compensation table is different from the second grayscale compensation table.

In some embodiments, the display panel is divided into at least one display area including at least one of the pixel units, and the line over driver compensation data further includes: a gain compensation table configured to record grayscale gain values corresponding to the at least one display area; and the over driver compensation module further includes:

a grayscale gain determining unit configured to determine, according to a position of the display area where the pixel unit is located and the gain compensation table included in the line over driver compensation data corresponding to the current frame image, a grayscale gain value corresponding to the pixel unit; and the target over driver grayscale determining unit is configured to determine, according to the determined initial over driver grayscale and the grayscale gain value, the target over driver grayscale of the pixel unit in the current frame image.

In some embodiments, the target over driver grayscale equals to a rounded product of the determined initial over driver grayscale and the grayscale gain value.

In some embodiments, the grayscale compensation table and the gain compensation table included in the line over driver compensation data corresponding to the first polarity frame image are a first grayscale compensation table and a first gain compensation table; and the grayscale compensation table and the gain compensation table included in the line over driver compensation data corresponding to the second polarity frame image are a second grayscale compensation table and a second gain compensation table;

where the first grayscale compensation table is different from the second grayscale compensation table, and the first gain compensation table is the same as the second gain compensation table;

or, the first grayscale compensation table is the same as the second grayscale compensation table, and the first gain compensation table is different from the second gain compensation table;

or, the first grayscale compensation table is different from the second grayscale compensation table, and the first gain compensation table is different from the second gain compensation table.

In some embodiments, the display driving device further includes: a source driver integrated circuit (IC) electrically connected to the over driver compensation module, and configured to provide, according to the target over driver grayscale from the over driver compensation module, a corresponding target over driver grayscale voltage signal for the display panel.

In some embodiments, the display driving device includes: a timing control integrated circuit (Tcon IC); where the Tcon IC is electrically connected to the source driver IC, and configured to control the source driver IC to work; and the Tcon IC includes the over driver compensation module.

In a second aspect, an embodiment of the present disclosure further provides a display device, including: the display driving device as provided in the second aspect described above.

In a third aspect, an embodiment of the present disclosure further provides a display driving method configured to control a display panel to display, where the display panel includes a plurality of pixel units, and the display driving method includes:

performing, when a first polarity frame image is displayed, line over driver compensation on the pixel units based on line over driver compensation data corresponding to the first polarity frame image, to determine a target over driver grayscale of the pixel units;

performing, when a second polarity frame image is displayed, line over driver compensation on the pixel units based on line over driver compensation data corresponding to the second polarity frame image, to determine a target over driver grayscale of the pixel units;

where the first polarity and the second polarity are opposite to each other, and the line over driver compensation data corresponding to the first polarity frame image is different from the line over driver compensation data corresponding to the second polarity frame image.

In some embodiments, before performing line over driver compensation on the pixel units, the method further includes:

storing the line over driver compensation data corresponding to the first polarity frame image and the second polarity frame image, respectively.

In some embodiments, the line over driver compensation data includes: a grayscale compensation table configured to record different combinations of previous line standard grayscales and current line standard grayscales, and initial over driver grayscales corresponding to the combinations; and the step of performing line over driver compensation on the pixel units includes:

determining, according to the previous line standard grayscale and the current line standard grayscale corresponding to a pixel unit and the grayscale compensation table included in the line over driver compensation data corresponding to a current frame image, an initial over driver grayscale corresponding to the pixel unit; and determining, according to the determined initial over driver grayscale, a target over driver grayscale of the pixel unit in the current frame image.

In some embodiments, the line over driver compensation data corresponding to the first polarity frame image includes a first grayscale compensation table;

the line over driver compensation data corresponding to the second polarity frame image includes a second grayscale compensation table; and the first grayscale compensation table is different from the second grayscale compensation table.

In some embodiments, the display panel is divided into at least one display area including at least one of the pixel units, and the line over driver compensation data further includes: a gain compensation table configured to record grayscale gain values corresponding to the at least one display area; and before determining, according to the determined initial over driver grayscale, the target over driver grayscale of the pixel unit in the current frame image, the method further includes:

determining, according to a position of the display area where the pixel unit is located and the gain compensation table included in the line over driver compensation data corresponding to the current frame image, a grayscale gain value corresponding to the pixel unit; and the step of determining, according to the determined initial over driver grayscale, the target over driver grayscale of the pixel unit in the current frame image specifically includes:

determining, according to the determined initial over driver grayscale and the grayscale gain value, the target over driver grayscale of the pixel unit in the current frame image.

In some embodiments, the target over driver grayscale equals to a rounded product of the determined initial over driver grayscale and the grayscale gain value.

In some embodiments, the grayscale compensation table and the gain compensation table included in the line over driver compensation data corresponding to the first polarity frame image are a first grayscale compensation table and a first gain compensation table; and the grayscale compensation table and the gain compensation table included in the line over driver compensation data corresponding to the second polarity frame image are a second grayscale compensation table and a second gain compensation table;

where the first grayscale compensation table is different from the second grayscale compensation table, and the first gain compensation table is the same as the second gain compensation table;

or, the first grayscale compensation table is the same as the second grayscale compensation table, and the first gain compensation table is different from the second gain compensation table;

or, the first grayscale compensation table is different from the second grayscale compensation table, and the first gain compensation table is different from the second gain compensation table.

BRIEF DESCRIPTION OF DRAWINGS

FIG. 5 is a block diagram of an over driver compensation module according to an embodiment of the present disclosure;

FIG. 6*a* is a schematic diagram of a grayscale compensation table according to an embodiment of the present disclosure;

FIG. 6*b* is another schematic diagram of a grayscale compensation table according to an embodiment of the present disclosure;

FIG. 7 is another block diagram of an over driver compensation module according to an embodiment of the present disclosure;

FIG. 8 is a schematic diagram of a gain compensation table according to an embodiment of the present disclosure;

FIG. 9 is a block diagram of another display driving device according to an embodiment of the present disclosure;

FIG. 10 is a flowchart of a display driving method according to an embodiment of the present disclosure;

DETAIL DESCRIPTION OF EMBODIMENTS

To improve understanding of the technical solution of the present disclosure for those skilled in the art, the display driving device, the display driving method and the display device of the present disclosure will be described in detail below with reference to the accompanying drawings.

In most applications of the over driver technology, a group of panel models correspond to a set of fixed line over driver compensation data, and line over driver compensation for each pixel unit of the display panel is performed based on the line over driver compensation data. In the existing art, the set of fixed line over driver compensation data specifically includes a grayscale compensation table configured to record different combinations of previous line standard grayscales and current line standard grayscales, and over driver grayscales corresponding to the combinations. In the process of displaying either a positive frame image or a negative frame image, the line over driver compensation for the pixel units of the display panel is based on the same grayscale compensation table. However, it is found in practical applications that when the line over driver compensations for the positive frame image and the negative frame image are based on the same set of fixed line over driver compensation data, a poor compensation effect is obtained, and image sticking tends to occur in the display image.

Figure 1:
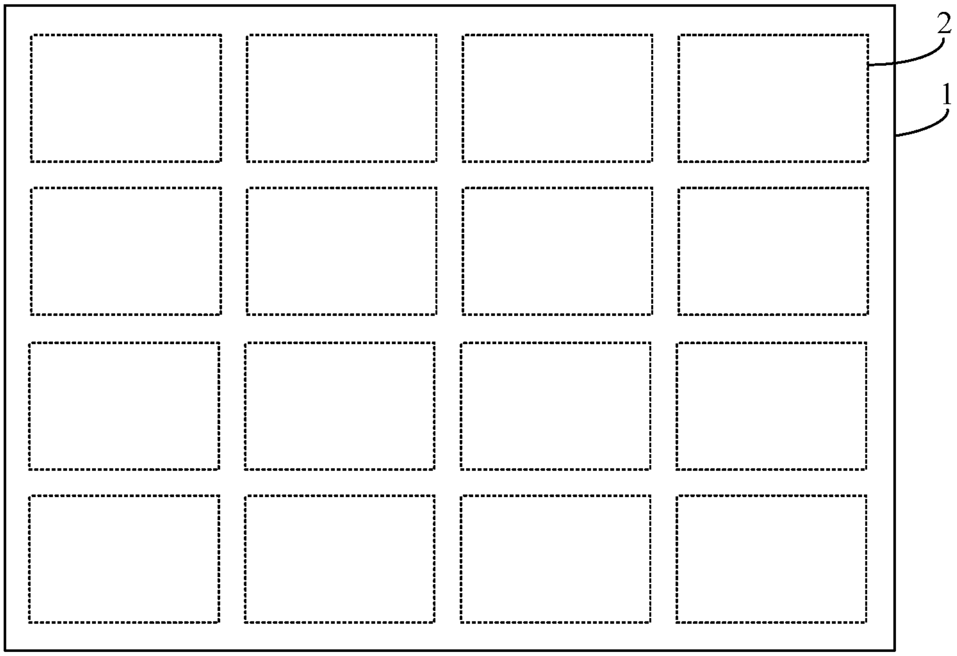
FIG. 1 is a schematic structural diagram of a display panel according to an embodiment of the present disclosure.
Figure 2:
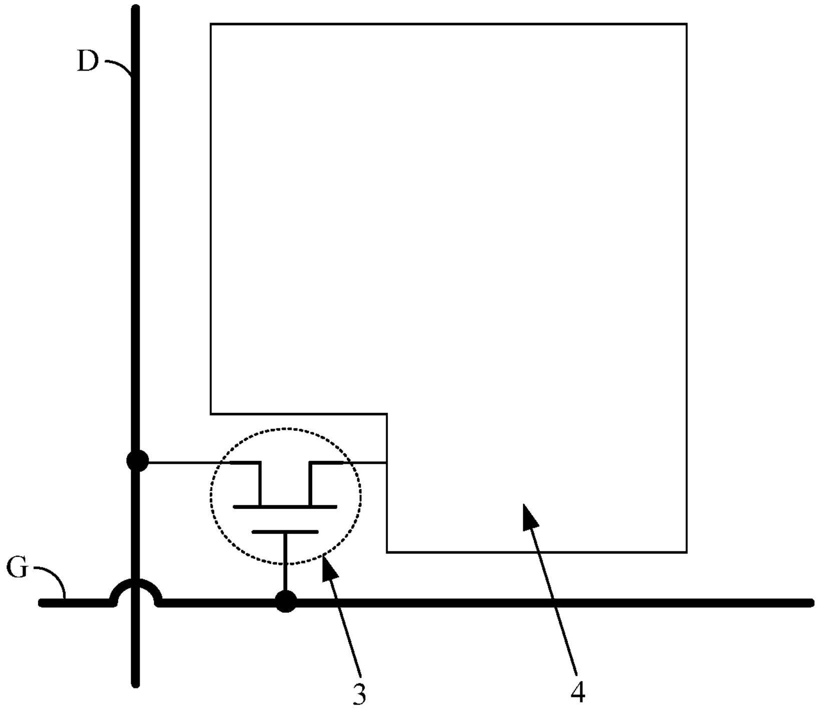
FIG. 2 is a schematic circuitry of a pixel unit in a display panel according to an embodiment of the present disclosure.
Figure 3:
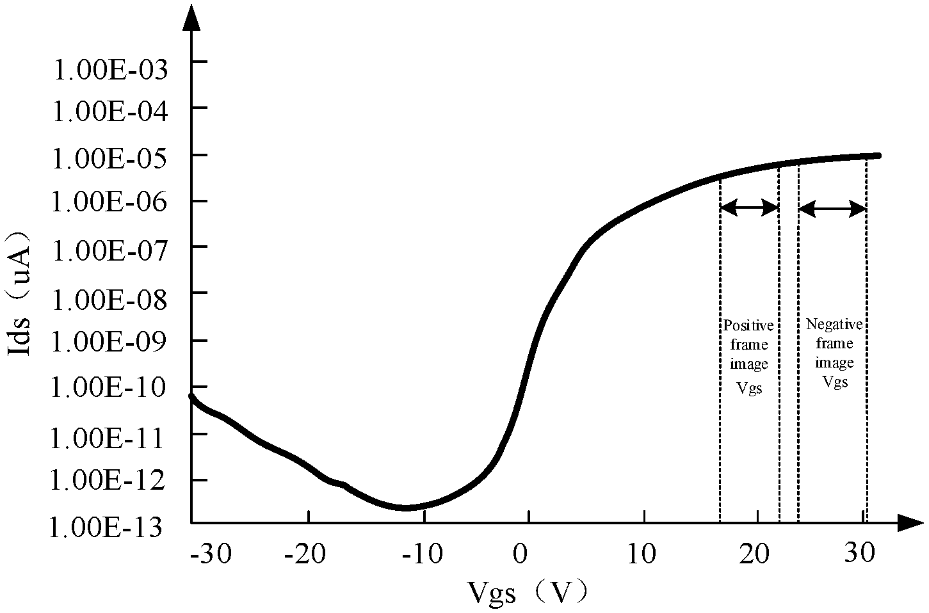
FIG. 3 is a schematic graph showing a current Ids output from a thin film transistor in a pixel unit varying with a gate-source voltage Vgs.

FIG. 1 is a schematic structural diagram of a display panel according to an embodiment of the present disclosure, FIG. 2 is a schematic circuitry of a pixel unit in a display panel according to an embodiment of the present disclosure, and FIG. 3 is a schematic graph showing a current Ids output from a thin film transistor 3 in a pixel unit varying with a gate-source voltage Vgs. As shown in FIGS. 1 to 3, a display panel 1 includes: a plurality of gate lines G, a plurality of data lines D, and a plurality of pixel units defined by the gate lines G and the data lines D. The pixel units includes: a thin film transistor 3 and a pixel electrode 4. A gate of the thin film transistor 3 is connected to a gate line G in a corresponding row, a source of the thin film transistor 3 is connected to a data line D in a corresponding column, and a drain of the thin film transistor 3 is connected to the pixel electrode 4 in a same pixel unit.

When a pixel unit is driven, the gate line G in the corresponding row provides a line scan driving voltage to control the thin film transistor 3 to be turned on, and the data line D in the corresponding column provides a grayscale voltage to control the thin film transistor 3 to output a current for charging the pixel electrode 4.

A case where a common voltage Vcom is 8.68V, a positive grayscale voltage $Vs_{positive}$ is 9.4V to 15.8V, a negative grayscale voltage $Vs_{negative}$ is 1.56V to 7.96V, and a line scan driving voltage Vg is 32V is taken as an example. In a positive frame image, the thin film transistor 3 has a gate-source voltage $Vgs_{positive}=Vg-Vs_{positive}$, where Vgs positive is in a range of 16.2 to 22.6V. In a negative frame image, the thin film transistor 3 has a gate-source voltage $Vgs_{negative}=Vg-Vs_{negative}$, where $Vgs_{negative}$ is in a range of 24.04V to 30.44V. Referring to FIG. 3, a charging rate of the thin film transistor 3 in the positive frame image (indicated by the output current Ids, where a larger current Ids indicates a faster charge rate) is lower than that in the negative frame image. That is, there is a charging difference in the positive/negative frame images.

In the existing art, when either a positive frame image or a negative frame image is displayed, the line over driver compensation on the pixel units is performed based on a same set of fixed line over driver compensation data, which cannot avoid the problem due to the charging difference in the positive/negative frame images as described above, and thus leads to a poor compensation effect. Specifically, undershooting is likely to occur in the positive frame image, while overshooting is likely to occur in the negative frame image, so that some area of the compensated image may be too dark, too light, or even have a wrong color.

In order to solve the above technical problems in the existing art, embodiments of the present disclosure provide a new technical solution for line over driver compensation, which will be described in detail below with reference to the accompanying drawings.

Figure 4:
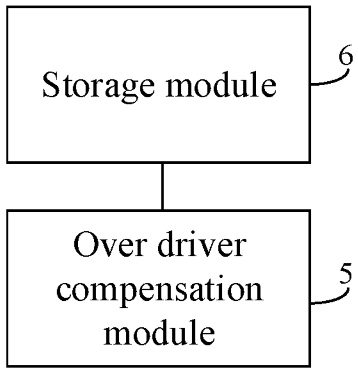
FIG. 4 is a block diagram of a display driving device according to an embodiment of the present disclosure.

FIG. 4 is a block diagram of a display driving device according to an embodiment of the present disclosure. As shown in FIG. 4, the display driving device is configured to control a display panel 1 to display. The display panel 1 includes a plurality of pixel units. The display driving device includes: an over driver compensation module 5.

The over driver compensation module 5 is configured to, when a first polarity frame image is displayed, perform line over driver compensation on the pixel units based on line over driver compensation data corresponding to the first polarity frame image, to determine a target over driver grayscale of the pixel units, and configured to, when a second polarity frame image is displayed, perform line over driver compensation on the pixel units based on line over driver compensation data corresponding to the second polarity frame image, to determine a target over driver grayscale of the pixel units. The first polarity and the second polarity are opposite to each other, and the line over driver compensation data corresponding to the first polarity frame image is different from the line over driver compensation data corresponding to the second polarity frame image.

In an embodiment of the present disclosure, the line over driver compensation data refers to data that can be used for line over driver compensation on the pixel units, which generally includes at least a grayscale compensation table, but obviously, may further include other data, which will be described in detail later with reference to specific examples.

One of the "first polarity" and the "second polarity" is positive, and the other is negative. In a positive frame image, a positive grayscale voltage is loaded to the pixel units, that is, the grayscale voltage is higher than the common voltage; while in a negative frame image, a negative grayscale voltage is loaded to the pixel units, that is, the grayscale voltage is lower than the common voltage.

In an embodiment of the present disclosure, different pieces of line over driver compensation data are respectively used in the positive frame image and the negative frame image for line over driver compensation, which can reduce or even eliminate the charging difference in the positive/negative frame images, thereby improving the image display effect.

In some embodiments, the display driving device further includes: a storage module 6 configured to store the line over driver compensation data corresponding to the first polarity frame image and the second polarity frame image, respectively.

FIG. 5 is a block diagram of an over driver compensation module 5 according to an embodiment of the present disclosure. As shown in FIG. 5, in some embodiments, the line over driver compensation data includes a grayscale compensation table, which is configured to record different combinations of previous line standard grayscales and current line standard grayscales and initial over driver grayscales corresponding to the combinations. The over driver compensation module 5 includes an initial over driver grayscale determining unit 501 and a target over driver grayscale determining unit 502.

The initial over driver grayscale determining unit 501 is configured to determine, according to the previous line standard grayscale and the current line standard grayscale corresponding to a pixel unit, and the grayscale compensation table included in the line over driver compensation data corresponding to a current frame image, an initial over driver grayscale corresponding to the pixel unit. The current frame image may be a first polarity frame image or a second polarity frame image.

FIG. 6*a* is a schematic diagram of a grayscale compensation table according to an embodiment of the present disclosure. As shown in FIG. 6*a*, in an embodiment, the grayscale compensation table may record different combinations of each previous line standard grayscale and each current line standard grayscale, and initial over driver grayscales corresponding to the combinations. Exemplarily, the grayscale is represented by 8 bits, and then there are 256 standard grayscales, L0 to L255. Therefore, the grayscale compensation table records a total of 256×256=65536 different combinations of 256 previous line standard grayscales and 256 current line standard grayscales, and initial over driver grayscales $A_{1,1}$ to $A_{256,256}$ corresponding to 65536 combinations, where $A_{m,n}$ represents the initial over driver grayscale corresponding to the combination of an $m^{th}$ previous line standard grayscale and an $n^{th}$ current line standard grayscale, and both m and n are positive integers less than or equal to 256. At this time, the initial over driver grayscale determining unit 501 may obtain the corresponding initial over driver grayscale by directly querying the grayscale compensation table corresponding to the current frame image.

FIG. 6*b* is another schematic diagram of a grayscale compensation table according to an embodiment of the present disclosure. As shown in FIG. 6*b*, in another embodiment, the grayscale compensation table records a current line target grayscale corresponding to both a plurality of specific previous line standard grayscales and a plurality of specific current line standard grayscales. The grayscale is represented by 8 bits, there are 256 standard grayscales, L0 to L255, and 17 specific standard grayscales are: L0, L16, L32, L48, L64, L80, L96, L112, L128, L144, L160, L176, L192, L208, L224, L240 and L255. At this time, the grayscale compensation table records a total of 17×17=289 different combinations of 17 specific previous line standard grayscales and 17 specific current line standard grayscales, and initial over driver grayscales $B_{1,1}$ to $B_{17,17}$ corresponding to 65536 combinations, where $B_{i,j}$ represents the initial over driver grayscale corresponding to the combination of an $i^{th}$ specific previous line standard grayscale and an $j^{th}$ specific current line standard grayscale, and i and j are non-negative integers less than or equal to 17. At this time, the initial over driver grayscale determining unit 501 may, based on data in the grayscale compensation table corresponding to the current frame image, fit an initial over driver grayscale corresponding to a combination of any previous line standard grayscale and any current line standard grayscale (for example, based on data in the grayscale compensation table corresponding to the current frame image, obtain an initial over driver grayscale corresponding to a combination of a previous line standard grayscale and a current line standard grayscale in the grayscale compensation table by interpolating).

The specific form of the grayscale compensation table, and the method for the initial over driver grayscale determining unit 501 determining the initial over driver grayscale according to the previous line standard grayscale, the current line standard grayscale, and the grayscale compensation table corresponding to the pixel unit, are not limited in the technical solution of the present disclosure.

In some embodiments, the line over driver compensation data corresponding to the first polarity frame image includes a first grayscale compensation table; the line over driver compensation data corresponding to the second polarity frame image includes a second grayscale compensation table; and the first grayscale compensation table is different from the second grayscale compensation table.

The first and second grayscale compensation tables may be obtained in the following method. Firstly, a product sample is selected, and a basic grayscale compensation table of the display panel 1 is acquired with a debugging tool in a conventional product debugging manner. Then, an overall charging difference of the product sample under a positive grayscale voltage and a negative grayscale is tested. An overall charging level in a duration in which the display panel 1 displays a positive frame image is denoted as 1, and an overall charging level in a duration in which the display panel 1 displays a positive frame image is denoted as K, where K is greater than 1. Taking the case where the first polarity is positive and the second polarity is negative as an example, then, the basic grayscale compensation table is taken as a first grayscale compensation table; and the initial over driver grayscale corresponding to each combination in the basic grayscale compensation table is multiplied by K, and if the result of multiplication is greater than the maximum standard grayscale, the result is set to the maximum standard grayscale, and the basic grayscale compensation table after being multiplied by K is taken as a second grayscale compensation table. In addition, in order to realize more refined line over driver compensation, the data obtained from the first and second grayscale compensation tables may be further refined based on actual needs.

The above process of obtaining the first and second grayscale compensation tables with different data is merely an optional implementation for the embodiments of the present disclosure, and does not make any limitation to the technical solution of the present disclosure. In an embodiment of the present disclosure, the first and second grayscale compensation tables may be obtained in other manners. For example, a corresponding first grayscale compensation table and a corresponding second grayscale compensation table may be directly generated from pre-acquired charging rates of the thin film transistor 3 under different positive grayscale voltages and different negative grayscale voltages. The specific method for generating the first and second grayscale compensation tables is not limited in the technical solution of the present disclosure.

The target over driver grayscale determining unit 502 is configured to determine, according to the determined initial over driver grayscale, a target over driver grayscale of the pixel unit in the current frame image.

In some embodiments, the target over driver grayscale of the pixel unit in the current frame image is the initial over driver grayscale determined by the initial over driver grayscale determining unit 501. Apparently, the target over driver grayscale may be determined by performing a certain operation on the initial over driver grayscale determined by the initial over driver grayscale determining unit 501 (for example, multiplying the initial over driver grayscale by a preset adjustment coefficient or adding a preset grayscale offset to the initial over driver grayscale), and taking the operation result as the target over driver grayscale. In an embodiment of the present disclosure, all technical means for determining the target over driver grayscale based on the initial over driver grayscale obtained from the grayscale compensation table shall fall into the protection scope of the present disclosure.

In the embodiment of the present disclosure, the line over driver compensation is made with use of different grayscale compensation tables respectively for the positive frame image and the negative frame image, which can reduce or even eliminate the charging difference in the positive/negative frame images, thereby improving the image display effect.

FIG. 7 is another block diagram of an over driver compensation module 5 according to an embodiment of the present disclosure. As shown in FIGS. 1 and 7, in some embodiments, the display panel 1 is divided into at least one display area 2 including at least one pixel unit, and the line over driver compensation data includes a grayscale compensation table and a gain compensation table. The grayscale compensation table is configured to record different combinations of previous line standard grayscales and current line standard grayscales, and initial over driver grayscales corresponding to the combinations. The gain compensation table is configured to record grayscale gain values (greater than 0) corresponding to the at least one display area 2.

In an embodiment of the present disclosure, the line over driver compensation data includes not only a grayscale compensation table, but also a gain compensation table. Based on the gain compensation table, characteristic differences (for example, inconsistent electrical characteristics of the thin film transistor 3, a common voltage offset, inconsistent RC delay amounts, or the like) of pixel units in different display areas 2 may be compensated.

There are various manners for dividing the display area 2. For example, the display panel 1 may be divided into 16 display areas 2 in 4 rows and 4 columns, or the display panel 1 may be divided into 96 display areas 2 in 12 rows and 8 columns, or 160 display areas 2 in 16 rows and 10 columns, or the like, which are not elaborated here one by one. Based on the characteristic difference of pixel units in each display area 2, a corresponding grayscale gain value is configured for each display area 2, and the pixel units in a same display area 2 correspond to a same grayscale gain value.

FIG. 8 is a schematic diagram of a gain compensation table according to an embodiment of the present disclosure. As shown in FIG. 8, the gain compensation table exemplarily shows the grayscale gain values corresponding to respective display area 2 when the display panel 1 is divided into 16 display areas 2 in 4 rows and 4 columns. In the figure, $Q_{a,b}$ represent the grayscale gain value corresponding to the display area 2 in row a and column b, and a and b are both positive integers less than or equal to 4.

In addition, to implement precise gain compensation, different grayscale compensation tables may be used for the positive frame image and the negative frame image. As an example, firstly, a product sample is selected, and a basic gain compensation table of the display panel 1 is acquired with a debugging tool in a conventional product debugging manner. Then, an overall charging difference of the product sample under a positive grayscale voltage and a negative grayscale is tested. An overall charging level in a duration in which the display panel 1 displays a positive frame image is denoted as 1, and an overall charging level in a duration in which the display panel 1 displays a positive frame image is denoted as K, where K is greater than 1. Taking the case where the first polarity is positive and the second polarity is negative as an example, then, the basic gain compensation table is taken as a first gain compensation table; and the grayscale gain value corresponding to each display area 2 in the basic gain compensation table is multiplied by K, and the basic gain compensation table after being multiplied by K is taken as a second gain compensation table. In addition, in order to realize more refined line over driver compensation, the data obtained from the first and second gain compensation tables may be further refined based on actual needs.

In the present embodiment, the over driver compensation module 5 includes: an initial over driver grayscale determining unit 501, a grayscale gain determining unit 503, and a target over driver grayscale determining unit 502.

The initial over driver grayscale determining unit 501 is configured to determine, according to the previous line standard grayscale and the current line standard grayscale corresponding to a pixel unit and the grayscale compensation table included in the line over driver compensation data corresponding to a current frame image, an initial over driver grayscale corresponding to the pixel unit. For details, reference may be made to the above description, and are not repeated here.

The grayscale gain determining unit 503 is configured to determining, according to a position of the display area 2 where the pixel unit is located and the gain compensation table included in the line over driver compensation data corresponding to the current frame image, a grayscale gain value corresponding to the pixel unit.

The target over driver grayscale determining unit 502 is configured to determine, according to the determined initial over driver grayscale and the grayscale gain value, a target over driver grayscale of the pixel unit in the current frame image.

In some embodiments, the target over driver grayscale equals to a rounded (e.g., rounded off, rounded up, or rounded down) product of the determined initial over driver grayscale and the grayscale gain value. If the rounded product of the initial over driver grayscale and the grayscale gain value is greater than the maximum standard grayscale, the target over driver grayscale is set to the maximum standard grayscale.

The line over driver compensation data corresponding to the first polarity frame image includes a first grayscale compensation table and a first gain compensation table, and the line over driver compensation data corresponding to the second polarity frame image includes a second grayscale compensation table and a second gain compensation table.

As a first scheme, the first grayscale compensation table is different from the second grayscale compensation table, and the first gain compensation table is the same as the second gain compensation table. At this time, the storage module 6 stores 3 compensation tables in total, i.e., 2 different grayscale compensation tables and 1 gain compensation table. The two different grayscale compensation tables correspond to the positive frame image and the negative frame image, respectively, and the one gain compensation table may be the basic gain compensation table as described above.

As a second scheme, the first grayscale compensation table is the same as the second grayscale compensation table, and the first gain compensation table is different from the second gain compensation table. At this time, the storage module 6 stores 3 compensation tables in total, i.e., 1 grayscale compensation table and 2 different gain compensation tables. The one grayscale compensation table may be the basic grayscale compensation table as described above, and the two different gain compensation tables correspond to the positive frame image and the negative frame image, respectively.

As a third scheme, the first grayscale compensation table is different from the second grayscale compensation table, and the first gain compensation table is different from the second gain compensation table. At this time, the storage module 6 stores 4 compensation tables in total, i.e., 2 grayscale compensation tables and 2 different gain compensation tables. The two grayscale compensation tables may be obtained through different adjustments on the above-mentioned basic grayscale compensation table according to an actual charging difference of the positive/negative frame images, and the two different gain compensation tables may be obtained through different adjustments on the basic gain compensation table according to the actual charging difference of the positive/negative frame images.

In the first and second schemes, the line over driver compensation is performed based on the 3 compensation tables (2 grayscale compensation tables and 1 gain compensation table, or 1 grayscale compensation table and 2 gain compensation tables), so that a less amount of line over driver compensation data is desired, and less data storage space is occupied. In the third scheme, the line over driver compensation is performed based on the 4 compensation tables (2 grayscale compensation tables and 2 gain compensation tables), so that more refined compensation control can be implemented.

FIG. 9 is a block diagram of another display driving device according to an embodiment of the present disclosure. As shown in FIG. 9, the display driving device includes not only the over driver compensation module 5 and the storage module 6 shown in FIG. 4, but also: a source driver IC 8. For description of the over driver compensation module 5 and the storage module 6, reference may be made to the foregoing embodiments, and details are not repeated here.

The source driver IC 8 is electrically connected to the over driver compensation module 5 and the data lines on the display panel 1, and configured to generate, according to the target over driver grayscale provided from the over driver compensation module 5, a target over driver grayscale voltage signal corresponding to the target over driver grayscale, and provide the over driver grayscale voltage signal to a data line of the display panel 1 connected to the corresponding pixel unit.

In some embodiments, the display driving device further includes: a gate driver IC 9. The gate driver IC 9 is electrically connected to the gate lines on the display panel 1, and configured to sequentially provide a line scan driving voltage to the gate lines.

The process of driving a certain pixel unit with the gate driver IC 9 and the source driver IC 8 is substantially as follows: the gate driver IC 9 provides a line scan driving voltage to a gate line connected to the pixel unit, to control the thin film transistor in the pixel unit to be turned on; and the source driver IC 8 provides a target over driver grayscale voltage signal to a data line connected to the pixel unit, and the thin film transistor in the pixel unit charges the pixel electrode according to the received target over driver grayscale voltage signal, so that a desired grayscale voltage is loaded to the pixel electrode, and the pixel unit can present corresponding grayscale brightness.

In some embodiments, the display driving device includes: a timing control integrated circuit (Tcon IC) 7, which is electrically connected to the source driver IC 8 and the gate driver IC 9, and configured to control the source driver IC 8 and the gate driver IC 9 to operate. The Tcon IC 7 is a conventional structure in a display driving device, and the specific circuitry and working process thereof are not described in detail here.

In some embodiments, the Tcon IC 7 includes the over driver compensation module 5 as described above. Apparently, the Tcon IC 7 may also include the storage module 6 as described above. In other words, both the over driver compensation module 5 and the storage module 6 may be integrated in the Tcon IC 7, so that the Tcon IC 7 has a function of performing line over driver compensation on pixel units.

Based on the same inventive concept, an embodiment of the present disclosure further provides a display driving method based on the display driving device described in the foregoing embodiments. FIG. 10 is a flowchart of a display driving method according to an embodiment of the present disclosure. As shown in FIG. 10, the display driving method is configured to control a display panel to display. The display panel includes a plurality of pixel units, and the display driving method includes the following steps S1 to S2.

Step S1 includes performing, when a first polarity frame image is displayed, line over driver compensation on the pixel units based on line over driver compensation data corresponding to the first polarity frame image, to determine a target over driver grayscale of the pixel units.

Step S2 includes performing, when a second polarity frame image is displayed, line over driver compensation on the pixel units based on line over driver compensation data corresponding to the second polarity frame image, to determine a target over driver grayscale of the pixel units.

The first polarity and the second polarity are opposite to each other, and the line over driver compensation data corresponding to the first polarity frame image is different from the line over driver compensation data corresponding to the second polarity frame image.

When the display panel in the display device display in a frame inversion mode, the above steps S1 and S2 are performed alternately.

In some embodiments, before steps S1 and S2, the method further includes: storing the line over driver compensation data corresponding to the first polarity frame image and the second polarity frame image, respectively.

Figure 11:
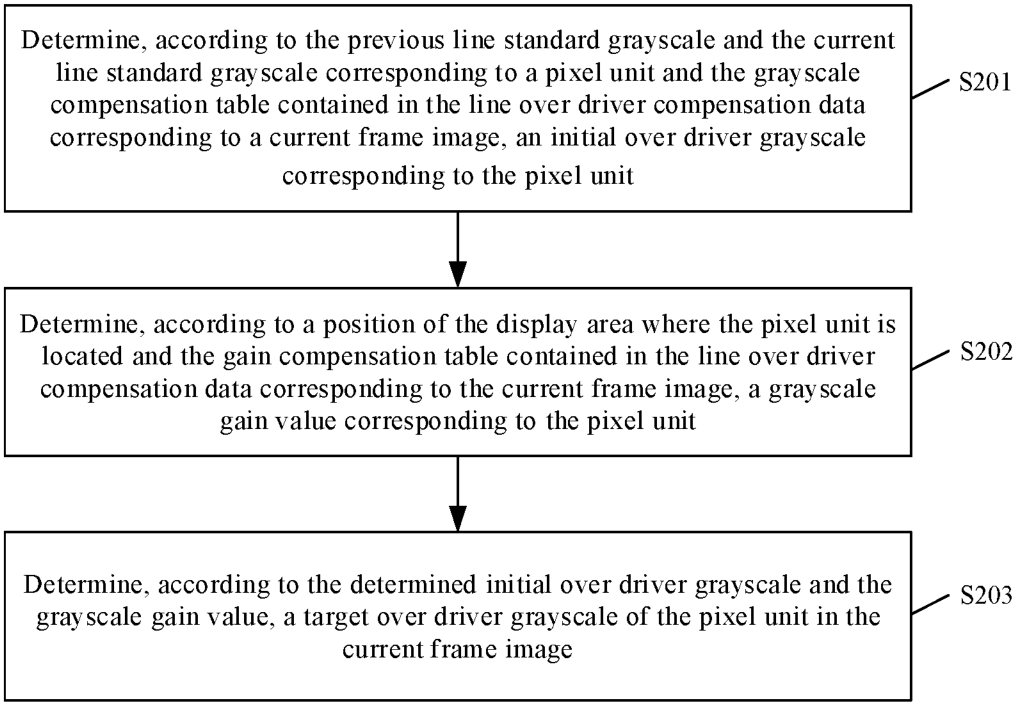
FIG. 11 is a flowchart of an optional implementation of the line over driver compensation for pixel units in steps S1 and S2.

FIG. 11 is a flowchart of an optional implementation of the line over driver compensation for pixel units in S1 and S2. As shown in FIG. 11, in some embodiments, the line over driver compensation data includes: a grayscale compensation table configured to record different combinations of previous line standard grayscales and current line standard grayscales, and initial over driver grayscales corresponding to the combinations. The step of performing line over driver compensation on the pixel unit according to the line over driver compensation data includes the following steps S101 to S102.

Step S101 includes determining, according to the previous line standard grayscale and the current line standard grayscale corresponding to a pixel unit and the grayscale compensation table included in the line over driver compensation data corresponding to a current frame image, an initial over driver grayscale corresponding to the pixel unit.

Step S102 includes determining, according to the determined initial over driver grayscale, a target over driver grayscale of the pixel unit in the current frame image.

In some embodiments, the line over driver compensation data corresponding to the first polarity frame image includes a first grayscale compensation table; the line over driver compensation data corresponding to the second polarity frame image includes a second grayscale compensation table; and the first grayscale compensation table is different from the second grayscale compensation table.

Figure 12:
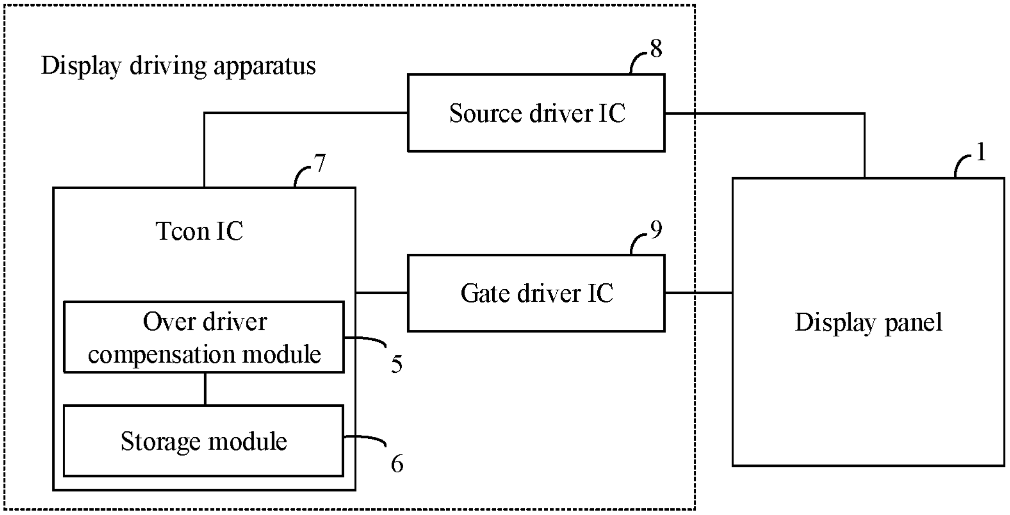
FIG. 12 is a flowchart of another optional implementation of the line over driver compensation for pixel units in steps S1 and S2.

FIG. 12 is a flowchart of another optional implementation of the line over driver compensation for pixel units in S1 and S2. As shown in FIG. 12, in some embodiments, the line over driver compensation data includes: a grayscale compensation table and a gain compensation table. The grayscale compensation table is configured to record different combinations of previous line standard grayscales and current line standard grayscales, and initial over driver grayscales corresponding to the combinations. The gain compensation table is configured to record grayscale gain values corresponding to the at least one display area. The step of performing line over driver compensation on the pixel unit according to the line over driver compensation data includes the following steps S201 to S203.

Step S201 includes determining, according to the previous line standard grayscale and the current line standard grayscale corresponding to a pixel unit and the grayscale compensation table included in the line over driver compensation data corresponding to a current frame image, an initial over driver grayscale corresponding to the pixel unit.

Step S202 includes determining, according to a position of the display area where the pixel unit is located and the gain compensation table included in the line over driver compensation data corresponding to the current frame image, a grayscale gain value corresponding to the pixel unit.

Step S203 includes determining, according to the determined initial over driver grayscale and the grayscale gain value, a target over driver grayscale of the pixel unit in the current frame image.

In some embodiments, the target over driver grayscale equals to a rounded product of the determined initial over driver grayscale and the grayscale gain value.

In some embodiments, the line over driver compensation data corresponding to the first polarity frame image includes a first grayscale compensation table and a first gain compensation table, and the line over driver compensation data corresponding to the second polarity frame image includes a second grayscale compensation table and a second gain compensation table.

The first grayscale compensation table is different from the second grayscale compensation table, and the first gain compensation table is the same as the second gain compensation table; or, the first grayscale compensation table is the same as the second grayscale compensation table, and the first gain compensation table is different from the second gain compensation table; or, the first grayscale compensation table is different from the second grayscale compensation table, and the first gain compensation table is different from the second gain compensation table.

For detailed description of the above steps, reference may be made to the contents about the display driving device in the foregoing embodiments, and details are not repeated here.

Based on the same inventive concept, an embodiment of the present disclosure further provides a display device, including the display driving device provided in any of the above embodiments, and a liquid crystal display panel driven by the display driving device.

Specifically, the display device in the embodiment of the present disclosure may be a liquid crystal display, a tablet, a computer, a mobile phone, or any other structure or product with a display function.

It will be appreciated that the above implementations are merely exemplary implementations for the purpose of illustrating the principle of the present disclosure, and the present disclosure is not limited thereto. It will be apparent to one of ordinary skill in the art that various modifications and variations may be made without departing from the spirit or essence of the present disclosure. Such modifications and variations should also be considered as falling into the protection scope of the present disclosure.

What is claimed is:

1. A display driving device configured to control a display panel comprising a plurality of pixel units to display, the display driving device comprising:

an over driver compensation module configured to, when a first polarity frame image is displayed, perform line over driver compensation on the pixel units based on line over driver compensation data corresponding to the first polarity frame image, to determine a target over driver grayscale of the pixel units; and to, when a second polarity frame image is displayed, perform line over driver compensation on the pixel units based on line over driver compensation data corresponding to the second polarity frame image, to determine a target over driver grayscale of the pixel units;

wherein the first polarity and the second polarity are opposite to each other, and the line over driver compensation data corresponding to the first polarity frame image is different from the line over driver compensation data corresponding to the second polarity frame image, wherein the line over driver compensation data comprises: a grayscale compensation table configured to record different combinations of previous line standard grayscales and current line standard grayscales, and initial over driver grayscales corresponding to the combinations; and the over driver compensation module comprises:

an initial over driver grayscale determining unit configured to determine, according to the previous line standard grayscale and the current line standard grayscale corresponding to a pixel unit and the grayscale compensation table of the line over driver compensation data corresponding to a current frame image, an initial over driver grayscale corresponding to the pixel unit; and a target over driver grayscale determining unit configured to determine, according to the determined initial over driver grayscale, a target over driver grayscale of the pixel unit in the current frame image, wherein the display panel is divided into at least one display area comprising at least one of the pixel units, and the line over driver compensation data further comprises a gain compensation table configured to record grayscale gain values corresponding to the at least one display area; and the over driver compensation module further comprises:

a grayscale gain determining unit configured to determine, according to a position of the display area where the pixel unit is located and the gain compensation table of the line over driver compensation data corresponding to the current frame image, a grayscale gain value corresponding to the pixel unit; and the target over driver grayscale determining unit is configured to determine, according to the determined initial over driver grayscale and the grayscale gain value, the target over driver grayscale of the pixel unit in the current frame image.

2. The display driving device according to claim 1, further comprising:

a storage module configured to store the line over driver compensation data corresponding to the first polarity frame image and the second polarity frame image, respectively.

3. The display driving device according to claim 1, wherein the gray compensation table of the line over driver compensation data corresponding to the first polarity frame image is a first grayscale compensation table;

the gray compensation table of the line over driver compensation data corresponding to the second polarity frame image is a second grayscale compensation table; and the first grayscale compensation table is different from the second grayscale compensation table.

4. The display driving device according to claim 1, wherein the target over driver grayscale equals to a rounded product of the determined initial over driver grayscale and the grayscale gain value.

5. The display driving device according to claim 1, wherein the grayscale compensation table and the gain compensation table of the line over driver compensation data corresponding to the first polarity frame image are a first grayscale compensation table and a first gain compensation table; and the grayscale compensation table and the gain compensation table of the line over driver compensation data corresponding to the second polarity frame image are a second grayscale compensation table and a second gain compensation table;

wherein the first grayscale compensation table is different from the second grayscale compensation table, and the first gain compensation table is the same as the second gain compensation table;

or, the first grayscale compensation table is the same as the second grayscale compensation table, and the first gain compensation table is different from the second gain compensation table;

or, the first grayscale compensation table is different from the second grayscale compensation table, and the first gain compensation table is different from the second gain compensation table.

6. The display driving device according to claim 1, further comprising a source driver integrated circuit (IC), wherein the source driver IC is electrically connected to the over driver compensation module, and configured to provide, according to the target over driver grayscale from the over driver compensation module, a corresponding target over driver grayscale voltage signal for the display panel.

7. The display driving device according to claim 6, further comprising a timing control integrated circuit (Tcon IC); wherein the Tcon IC is electrically connected to the source driver IC, and configured to control the source driver IC to work; and the Tcon IC comprises the over driver compensation module.

8. A display device, comprising: the display driving device according to claim 1.

9. A display driving method for controlling a display panel comprising a plurality of pixel units to display, the display driving method comprising:

performing, when a first polarity frame image is displayed, line over driver compensation on the pixel units based on line over driver compensation data corresponding to the first polarity frame image, to determine a target over driver grayscale of the pixel units; and performing, when a second polarity frame image is displayed, line over driver compensation on the pixel units based on line over driver compensation data corresponding to the second polarity frame image, to determine a target over driver grayscale of the pixel units;

wherein the first polarity and the second polarity are opposite to each other, and the line over driver compensation data corresponding to the first polarity frame image is different from the line over driver compensation data corresponding to the second polarity frame image, wherein the line over driver compensation data comprises: a grayscale compensation table configured to record different combinations of previous line standard grayscales and current line standard grayscales, and initial over driver grayscales corresponding to the combinations; and the step of performing line over driver compensation on the pixel units comprises:

determining, according to the previous line standard grayscale and the current line standard grayscale corresponding to a pixel unit and the grayscale compensation table of the line over driver compensation data corresponding to a current frame image, an initial over driver grayscale corresponding to the pixel unit; and determining, according to the determined initial over driver grayscale, a target over driver grayscale of the pixel unit in the current frame image, wherein the display panel is divided into at least one display area comprising at least one of the pixel units, and the line over driver compensation data further comprises: a gain compensation table configured to record grayscale gain values corresponding to the at least one display area; and before determining, according to the determined initial over driver grayscale, the target over driver grayscale of the pixel unit in the current frame image, the method further comprises:

determining, according to a position of the display area where the pixel unit is located and the gain compensation table of the line over driver compensation data corresponding to the current frame image, a grayscale gain value corresponding to the pixel unit; and the step of determining, according to the determined initial over driver grayscale, the target over driver grayscale of the pixel unit in the current frame image comprises:

determining, according to the determined initial over driver grayscale and the grayscale gain value, the target over driver grayscale of the pixel unit in the current frame image.

10. The display driving method according to claim 9, wherein before performing line over driver compensation on the pixel units, the method further comprises:

storing the line over driver compensation data corresponding to the first polarity frame image and the second polarity frame image, respectively.

11. The display driving method according to claim 10, wherein the line over driver compensation data comprises: a grayscale compensation table configured to record different combinations of previous line standard grayscales and current line standard grayscales, and initial over driver grayscales corresponding to the combinations; and the step of performing line over driver compensation on the pixel units comprises:

determining, according to the previous line standard grayscale and the current line standard grayscale corresponding to a pixel unit and the grayscale compensation table of the line over driver compensation data corresponding to a current frame image, an initial over driver grayscale corresponding to the pixel unit; and determining, according to the determined initial over driver grayscale, a target over driver grayscale of the pixel unit in the current frame image.

12. The display driving method according to claim 9, wherein the line over driver compensation data corresponding to the first polarity frame image comprises a first grayscale compensation table;

the line over driver compensation data corresponding to the second polarity frame image comprises a second grayscale compensation table; and the first grayscale compensation table is different from the second grayscale compensation table.

13. The display driving method according to claim 9, wherein the target over driver grayscale equals to a rounded product of the determined initial over driver grayscale and the grayscale gain value.

14. The display driving method according to claim 9, wherein the grayscale compensation table and the gain compensation table of the line over driver compensation data corresponding to the first polarity frame image are a first grayscale compensation table and a first gain compensation table; and the grayscale compensation table and the gain compensation table of the line over driver compensation data corresponding to the second polarity frame image are a second grayscale compensation table and a second gain compensation table;

wherein the first grayscale compensation table is different from the second grayscale compensation table, and the first gain compensation table is the same as the second gain compensation table;

or, the first grayscale compensation table is the same as the second grayscale compensation table, and the first gain compensation table is different from the second gain compensation table;

or, the first grayscale compensation table is different from the second grayscale compensation table, and the first gain compensation table is different from the second gain compensation table.

* * * * *